May 27, 1969 W. SCHOLZ 3,446,913
TRANSIT TIME DEMODULATOR FOR PHASE QUADRATURE
MODULATED COLOR SIGNALS
Filed June 27, 1966

Inventor:
Werner Scholz
by Spencer & Kaye
Attorneys

United States Patent Office 3,446,913

Patented May 27, 1969

3,446,913

TRANSIT TIME DEMODULATOR FOR PHASE QUADRATURE MODULATED COLOR SIGNALS

Werner Scholz, Hannover-Linden, Germany, assignor to Telefunken Patentverwertungsgesellschaft m.b.H., Ulm, Danube, Germany Filed June 27, 1966, Ser. No. 560,637
Claims priority, application Germany, June 26, 1965, T 28,886
Int. Cl. H04n 5/48
U.S. Cl. 178—5.4 7 Claims The present invention relates to a transit time demodulator for color television signals which are phase quadrature modulated and have a modulation axis which is phase-shifted by 180° every other line.

More particularly, the present invention relates to a transmit time demodulator for use in receivers of so-called PAL-color television signals, herein two color difference signals are transmitted by quadrature modulation of a color carrier wave, the phase of one of the color difference signals being shifted by 180° with every line.

A transit time demodulator is a circuit incorporating a delay line which delays the color carrier signal for a time interval that lasts for the duration of one line, there being two adder stages in which the delayed signal is added and subtracted, respectively, to the undelayed signal in such a phase that in each of the two stages the color signal corresponding to one of the modulation axes is canceled. In this way, one color signal, for instance, the I signal, is produced at one terminal of the transit time demodulator while the other color signal, Q, is produced at the other terminal.

One major difficulty encountered in heretofore known transit time demodulators was that the color signals appearing at the outputs of the demodulator had to have the same amplitude. In order to accomplish this, it was customary to adjust the amplitude of the undelayed or delayed color carrier signal at the input or at the output of the delay line, to connect a push-pull transformer having a large coupling inductance to the input or output of the delay line thereby to avoid the unfavorable influence of the stray inductance, and to provide a small inductance for neutralizing the input capacitance of the delay line. The adding and subtracting was carried out by respective voltage dividers arranged between the input and output of the delay line, with suitable phase shifting means being interposed in series with one of the voltage dividers for phase shifting the color signal by 180°. Such an arrangement is described in Telefunken-Zeitung, 1964, No. 1, page 63, FIGURE 1*c*. It will be appreciated that the circuitry involved is expensive.

It is, therefore, the primary object of the present invention to provide a transit time demodulator which overcomes the above drawbacks, namely to provide a transit time demodulator which eliminates the problems of amplitude adjustment and capacitance neutralization and, moreover, is capable of doing so with a minimum of structural components.

With the above objects in view, the present invention resides, basically, in a transit time demodulator incorporating a push-pull transformer for producing oppositely phased color carrier signals, wherein one winding of this push-pull transformer is connected in parallel with the input capacitance of the delay line, thereby to neutralize this input capacitance.

In accordance with a further feature of the present invention, the input side of the push-pull transformer is adjustable, for example, by means of an adjustable core.

In accordance with another feature of the present invention, the winding of the transformer which is connected in series with one of the voltage divider branches is associated with means for adjusting the amplitude. In practice, these means may be constituted by a winding which is displaceable with respect to the transformer winding.

In accordance with a preferred embodiment of the present invention, the push-pull transformer at the input of the delay line is wound as a bifilar transformer.

Additional objects and advantages of the present invention will become apparent upon consideration of the following description when taken in conjunction with the accompanying drawings in which.

Figures 1, 2:
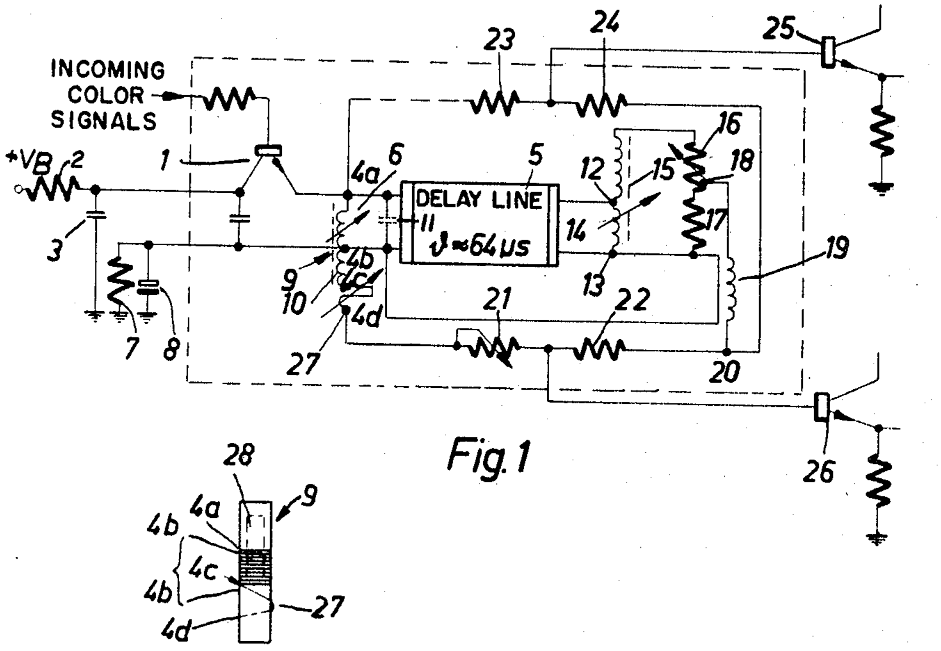
FIGURE 1 is a circuit diagram of one embodiment of a circuit according to the present invention.
FIGURE 2 shows a detail of the structure incorporated in a transformer used in the circuit of FIGURE 1.

Referring now to the drawings and first to FIGURE 1 thereof in particular, the same shows a transistor 1 whose collector is connected via a resistor 2 to an operating voltage $+V_B$, the collector also being grounded via a capacitor 3. The incoming color signals are applied to the base of the transistor 1. The emitter of transistor 1 is connected to an input terminal **4*a* of a delay line 5**, the latter delaying the color signals for a time interval equal to the duration of one line, e.g. the time delay $\vartheta$ may be equal to 64 microseconds.

The emitter circuit of transistor 1 comprises the winding 6 of a push-pull transformer 9 and a grounded resistor 7, there being a capacitor 8 connected in parallel with the resistor 7. The junction between the winding 6 and the other winding 10 of the push-pull transformer 9 is connected to the other input terminal **4*b* of the delay line 5. In this way, the winding 6 is connected in parallel with the input terminals of the delay line 5 and is thus in parallel with the input capacitance of the delay line. This input capacitance, shown at 11, is, for example, 1.3 nf. The winding 6 is so constructed that it is adjustable and thus serves as a means for neutralizing the input capacitance 11**.

The output terminls 12 and 13 of the delay line are connected to that part of the winding of autotransformer 15 which is common to both the primary and the secondary circuits, this part being shown at 14. The output terminals of the autotransformer are connected to a series-circuit formed by a potentiometer 16 and a resistor 17. The slide 18 of the potentiometer 16 is connected via a further delay line 19 to the junction 20 of two voltage divider branches comprising serially connected resistors 21, 22 and 23, 24, respectively. The end of the voltage divider 23, 24, is connected to the terminal **4*a* of the delay line 5 and the end of the voltage divider 21, 22, is connected to the terminal of the push-pull transformer 9 remote from the terminal 4*a*. The junctions between resistors 21 and 22 and between resistors 23 and 24 are connected to the inputs of transistors 26 and 25, respectively. These transistors receive the sum and the difference of the undelayed and the delayed color signal, that is to say, the transistor 25 receives a carrier wave modulated by one of the color difference signals and the transistor 26** receives a carrier wave modulated by the other of the color difference signals.

In the circuit so far described the purpose of the push-pull transformer 9 in the input circuit of the delay line 5 is to neutralize the input capacitance of the delay line at the color carrier frequency. This is done by adjusting the inductance in parallel with the input terminals of the delay line, this being accomplished by adjusting a core within the winding. In the case of a low impedance source—constituted, in the illustrated circuit, by an emitter-follower circuit—the frequency response curve of the color channel is only slightly influenced by the neutralization.

If the compensation is properly adjusted, the distortion-free transferable color carrier amplitude is at a maximum.

In the circuit as described so far, the winding 10 of the push-pull transformer 9 serves for producing a signal of a phase opposite to that of the input signal which is required in a transit time demodulator, and this can be done very nicely by closing coupling the windings 6 and 10. To this end, the two windings 6 and 10 of the push-pull transformer are wound in a bifilar manner.

When a low-inductance coil (approximately 1/$\mu$h.) is used—this being necessary for neutralizing the input capacitance of the delay line—the unavoidable stray inductances of the wiring can no longer be ignored. In the circuit according to the invention, however, the arrangement represents a no-load transformer in which the voltage drop across the primary stray inductance causes only a reduction in amplitude at the push-pull output 4*c*, but no phase error. The phase error which is caused by the ohmic resistance of the primary winding is negligible.

If the resistors 21, 22, 23, 24 of the voltage dividers are not identical, the transit time demodulator will be asymmetrical. In order to avoid this disadvantage, the push-pull output 4*c* of the push-pull transformer 9 is provided with an additional winding 27 which, prior to final adjustment, is placed around the body of the coil. By shifting this additional winding, prior to final adjustment, the output amplitudes of the transit time demodulator can be substantially completely symmetrical. This cancels out any amplitude error for the push-pull output 4*d*. In this way, the amplitudes for both outputs of the transit time demodulator can be matched even if the resistors 21, 22, 23 and 24 are not identical. The practical significance of this is that the tolerance requirements of the resistors 21, 22, 23 and 24 are reduced.

The autotransformer 15 in the output circuit of the delay line 5 serves to step up the output amplitude to a value above the input amplitude. Furthermore, the autotransformer 15 matches the output impedance of the delay line to approximately that of the input resistance of the additional delay line 19 which is connected to the slide 18 of potentiometer 16. The characteristic impedance of the delay line 19 has a value corresponding to the input resistance of the resistance network formed by the resistors 21, 22, 23 and 24, and serves to compensate for the manufacturing tolerances of the delay line 5.

FIGURE 2 illustrates a practical example of the push-pull transformer 9 shown in FIGURE 1 and shows the same as incorporating a bifilar winding comprising the winding 6 connecting the terminals 4*a* and 4*b* and the winding 10 connecting the terminals 4*b* and 4*c*. The additional winding 27 connects the terminals 4*c* and 4*d*. The amplitude at the push-pull output terminal 4*d* can be adjusted by displacing and/or changing the effective length of the winding 27. In practice, the winding 27 may be constituted by a lead, so that, by adjusting the lead with respect to the transformer, the coupling of the lead to the transformer and thereby the amplitude of the signal appearing across the output of the winding may be varied. A core 28, arranged movably within the two windings, allows the inductance of the windings to be varied.

Figure 3:
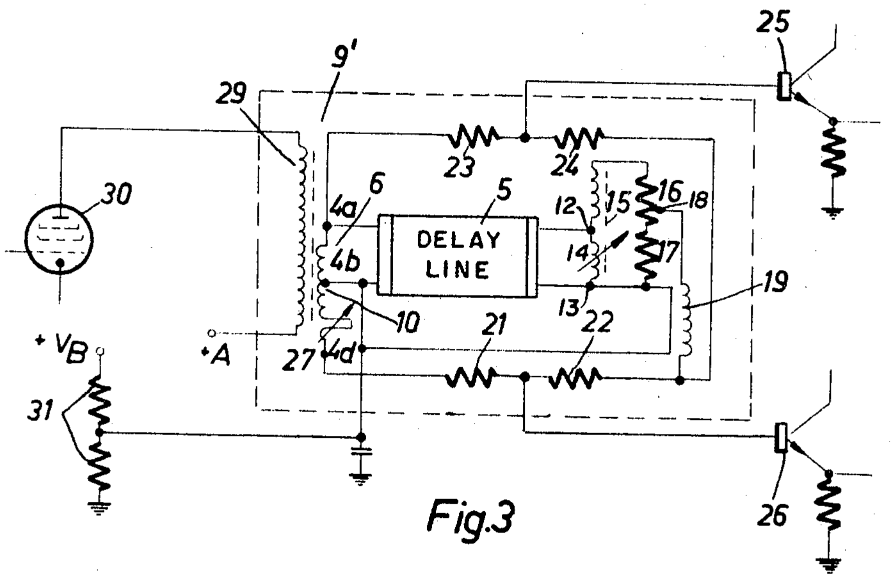
FIGURE 3 is a circuit diagram of another embodiment of a circuit according to the present invention.

The circuit of FIGURE 3 differs from that of FIGURE 1 in that the push-pull transformer is fed differently. In FIGURE 3, the push-pull transformer 9' has, in addition to the windings 6 and 10, a primary winding 29 which matches the transformer to a high ohmic source as, for example, to the collector of a transistor, or, as shown in FIGURE 3, to the plate of an amplifer tube 30.

The base bias voltage for the transistors 25 and 26 is obtained from a voltage divider 31.

Various modifications to the circuits shown are possible which are still within the scope of the invention. For example, instead of—or in addition to—using the additional winding 27 to adjust the output amplitude of the push-pull transformer, a potentiometer may be substituted for the resistors 21, 22 or be connected in series between these resistors. Alternatively, such a potentiometer may connect the two branches 21, 22 and 23, 24 together, the additional delay line 19 being connected to the slide of the potentiometer. As yet another alternative, the resistors 22, 23 and 24 may be fixed while the resistor 21 is adjustable.

In any event, the circuit, if equipped with the adjustable lead 27 described above, may utilize such lead as effecting a coarse adjustment of the signal appearing at the output of the resistance circuit connected to terminal 4*d*, while the potentiometer which is part of this resistance circuit may serve as a means for effecting a fine adjustment of this signal, as shown in FIGURE 1.

It will be understood that the above description of the present invention is susceptible to various modifications, changes, and adaptations, and the same are intended to be comprehended within the meaning and range of equivalents of the appended claims.

What is claimed is:

1. In a transit time demodulator for phase quadrature modulated color television signals, the combination which comprises:

(a) means forming a delay line, said delay line having input terminals across which there is an input capacitance; and (b) means for producing two color carrier signals which are of the opposite phase, said means including a push-pull transformer, the latter having two windings one of which is connected across said input terminals of said delay line and is a means for neutralizing said input capacitance of said delay line.

2. The combination defined in claim 1 wherein said transformer is wound as a bifilar transformer.

3. The combination defined in claim 2 wherein said transformer is provided with a core which is displaceable with respect to said windings.

4. The combination defined in claim 1 wherein said transformer is provided with means for adjusting the amplitude of the signal appearing across the other of said windings.

5. The combination as defined in claim 4 wherein said transformer includes a lead which is connected to said other winding and which is adjustable with respect thereto for enabling the coupling of said lead and thereby the amplitude of the signal appearing across said other winding to be varied.

6. The combination defined in claim 5, further comprising a resistance circuit connected to said other winding, said resistance circuit incorporating a potentiometer.

7. The combination defined in claim 6 wherein said adjustable lead is a means for effecting coarse adjustment of the signal appearing at the output of said resistance circuit and said potentiometer is a means for effecting a fine adjusting of said last-mentioned signal.

References Cited

UNITED STATES PATENTS 3,007,999 11/1961 Kelly ---------------- 178—5.4

ROBERT L. GRIFFIN, *Primary Examiner.*

ROBERT L. RICHARDSON, *Assistant Examiner.*

U.S. Cl. X.R.

328—133; 329—116, 145